Dec. 18, 1956     W. T. DOYLE     2,774,476
MACHINE FOR CLASSIFYING AND SEPARATING MATERIALS
Filed Oct. 25, 1954     3 Sheets-Sheet 1

INVENTOR.
William T. Doyle
BY
M. H. Hamilton
Attorney

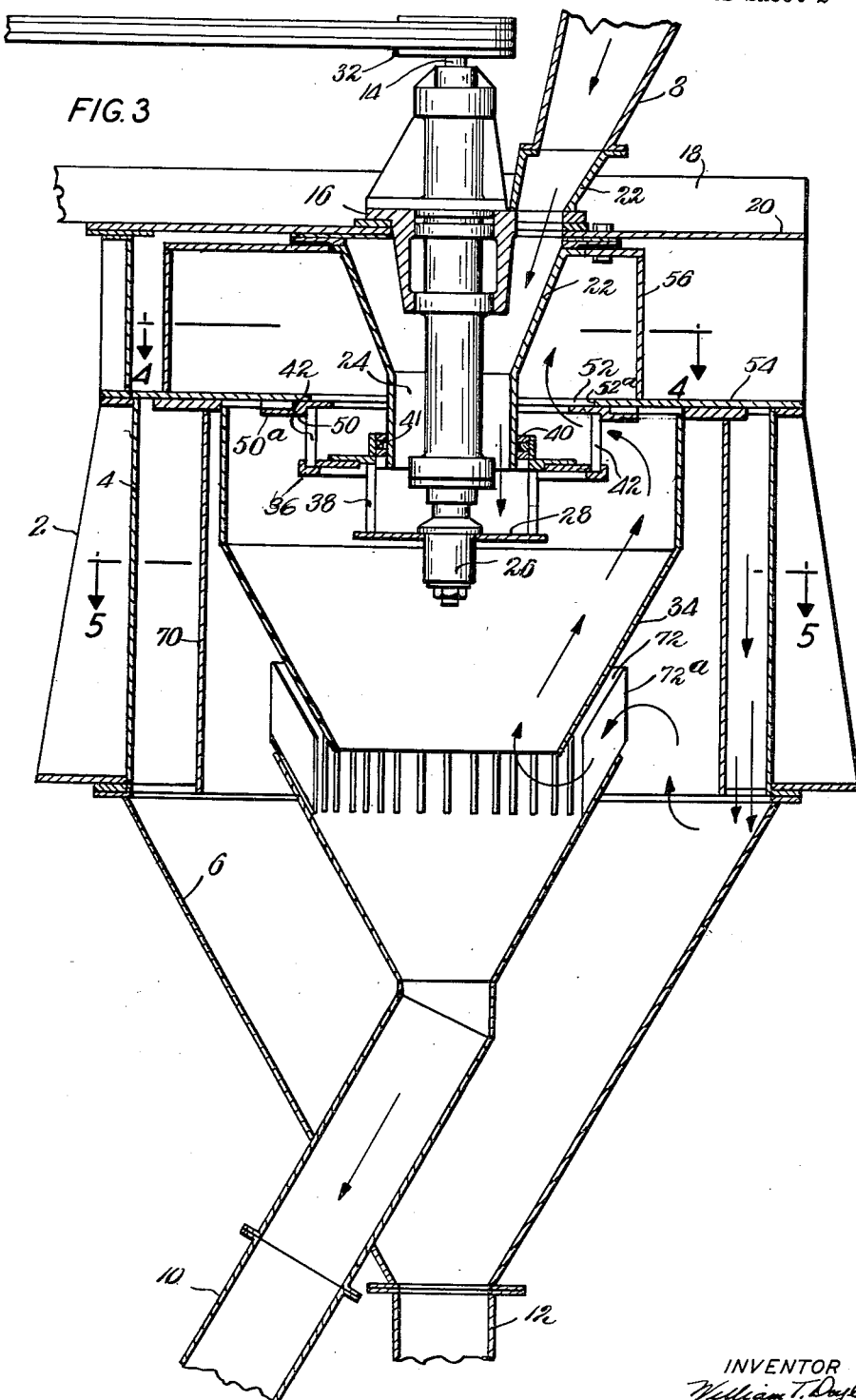

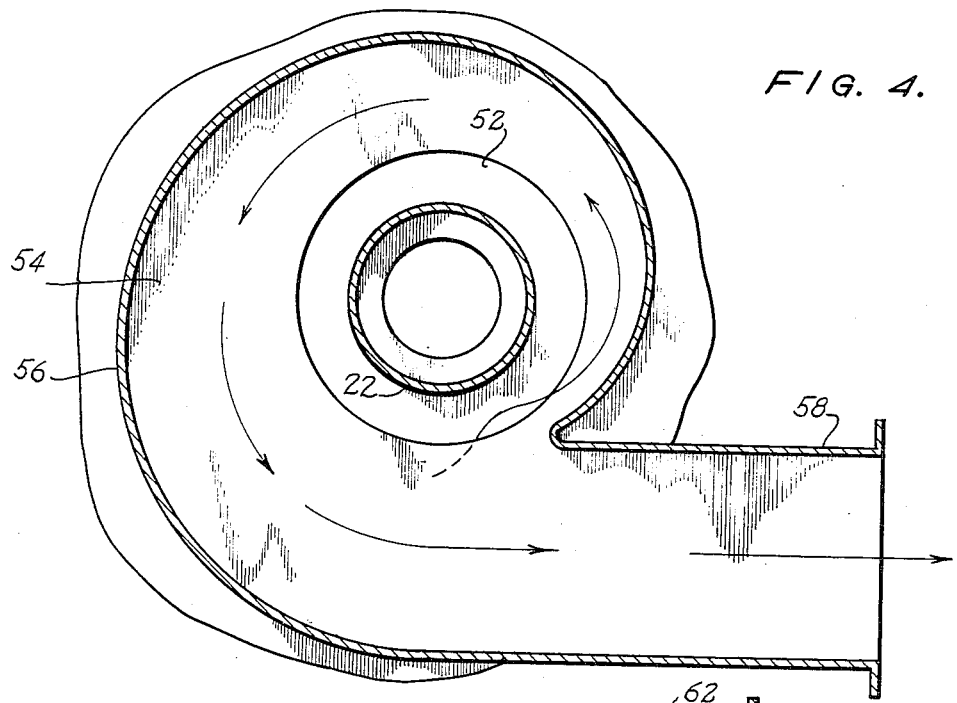
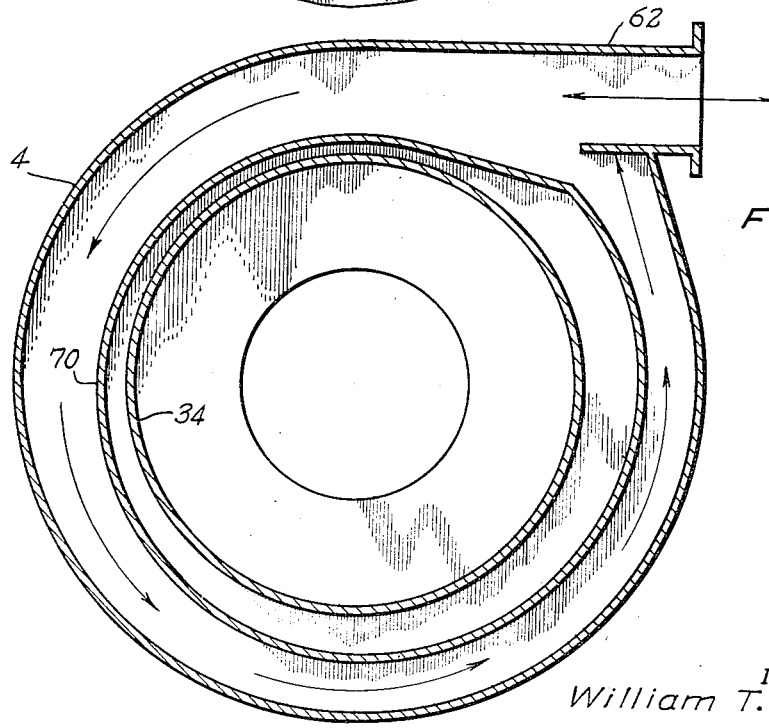

United States Patent Office 2,774,476
Patented Dec. 18, 1956

2,774,476

MACHINE FOR CLASSIFYING AND SEPARATING MATERIALS

William T. Doyle, Boston, Mass., assignor to Sturtevant Mill Company, Boston, Mass., a corporation of Massachusetts Application October 25, 1954, Serial No. 464,442

9 Claims. (Cl. 209—139)

This invention relates to an improved apparatus for centrifugal separation of finely divided materials such as, for example, limestone and various other substances which may be desired to be classified on the basis of constituent particle size.

In one general type of device heretofore employed in the art, it has been customary to utilize a rapidly rotating distributor plate whirling about a vertical axis and arranged in a position such that particles of material to be classified and separated may be fed by gravity on to the plate. Thereafter, the particles of finely divided material are acted upon by centrifugal forces and thrown radially outwardly away from the plate to lesser or greater degree, dependent upon the size and mass of the individual particles. There is also included means for producing a flow of air which operates to lift, in a vertically upward direction, some of the fine particles which have been centrifugally acted upon while permitting larger particles to fall away and pass downwardly through a discharge opening.

A very troublesome limitation is found to be present with these prior art devices. Such machines will, in most cases, operate efficiently to separate and remove particles in a range of the magnitude of, roughly, 40 microns and above, but the machines are unable to provide any worthwhile classification and recovery of particles in a smaller micron range such as, for example, particles having a micron size of from 15 microns down to as small as 5 microns or less. It happens that this particular micron size range has become of very considerable commercial significance, and there is an urgent need for a machine which will operate on a practical basis to classify and separate particles of various types of comminuted materials in a range of micron size below 40 microns and, especially, in the 15–5 micron range.

The present invention is concerned with the problem indicated and seeks to provide an improved apparatus for classifying and separating comminuted products. More specifically, it is the object of the invention to devise a combination of classifier mechanism elements and means for producing the flow of air currents so as to achieve a sharp classification of particles occurring in small micron sizes.

The nature of the invention and its objects will be more fully understood and appreciated from the following description of a preferred embodiment for purposes of illustration and shown in the accompanying drawings in which, Fig. 1 is a plan view of the separator apparatus of the invention;

Fig. 3 is a fragmentary enlarged vertical cross-section taken approximately centrally of the casing structure shown in Figs. 1 and 2;

Fig. 4 is a cross-sectional taken on the line 4—4 of Fig. 3; and

Fig. 5 is a cross-section taken on the line 5—5 of Fig. 3.

Figure 1:
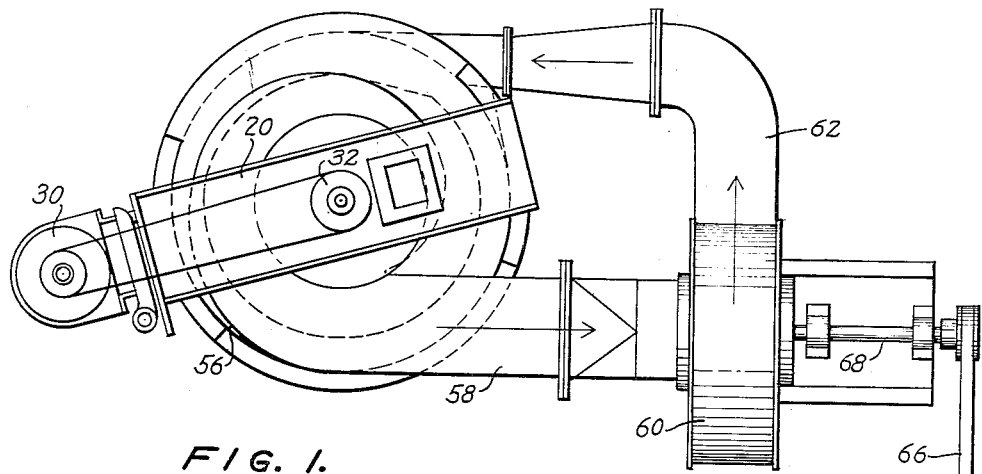

In accordance with the invention, I have found that classification and recovery of comminuted material in the 40–5 micron range may be successfully accomplished, from a commercially significant standpoint, by subjecting a gravity-fed, finely divided material to the action of controlled air currents which are applied in conjunction with the exertion of centrifugal forces so as to achieve segregation of particles in annular zones occurring one within another.

This new classification method is based essentially on the discovery that, by producing an upwardly spiralling current of air at points above and in close proximity to those regions into which particles are centrifugally displaced and by interposing rotating rejector blade elements between the centrifuged particles and the spiralling air currents, there may be exerted lifting forces of such precisely restricted intensity that only those particles in a very small micron range will be drawn through the rejector blade elements and upwardly to a suitable recovery point.

It is found that this upwardly spiralling current of air cooperates very desirably with another flow of air continuously whirling in a circumferentially directed path of movement, as a result of rotative movement of the rejector blade elements noted. This second flow of air operates to retard in varying degree the amount of centrifugal displacement of the differently sized particles so that they tend to move in concentric zones and to undergo a preclassification step. By combining the upwardly spiralling air flow with a blade induced air flow, particles in the 40–5 micron range are found to be more easily segregated from relatively coarser particles and can be separated without being accompanied to any appreciable extent by the relatively coarser particles.

In order to provide for a uniform flow of air to aid in removal of particles within the range of selectivity noted, I have devised special scroll-shaped conduit means having an aperture formed with converging sides which, at one point, lead into a fan member along a horizontally directed path. I combine with this scroll-shaped conduit a distributor plate and rejector blade structure of the class referred to above so that particles may be gravity fed onto the distributor plate and caused to undergo a preclassification step by which particles gather in concentric zones. Relatively smaller particles from the inner zones are classified by the rejector blades.

Those particles which pass through the rejector blades are lifted upwardly. The lifting forces exerted on particles in this manner are obtained by adjusting the speed of the fan at the scroll-shaped conduit to a value which will develop a pull sufficient to exceed the downward pull of the rotating rejector blades and yet limited to a value which will not draw particles of an undesirably large size through the rejector blades. The scroll-shaped conduit of the invention, when interposed between the fan and the rejector blades, functions much like a control valve for very precisely limiting the intensity of the upward air pull induced by the fan. This control valve action is derived from the fact that demand for air by the fan acts through the scroll passageway which is of converging shape and air is caused to move in an upwardly spiralling path rather than in a straight path. Therefore, particles leaving the rejector blades are necessarily carried in a spiralling air current. The lifting effect of such a spirally-induced air current is, I find, susceptible of very delicate control by adjusting the speed of the scroll fan with reference to the speed of the rejector blades.

The structure shown in the accompanying drawings is intended to be illustrative of one preferred embodiment of a scroll-shaped conduit arrangement which I have devised for carrying out the method of the invention. As noted in the drawings, numeral 2 denotes an outer casing which includes an upper cylindrical section 4 and a lower conical ground section 6. Finely divided material is introduced into the casing through a feed inlet 8 and classified material is discharged from the casing through discharge outlets 10 and 12.

In accordance with the invention, I mount within this casing 2 a classifier mechanism and scroll means for producing a spirally directed air current. Considering first the classifier mechanism, numeral 14 denotes a shaft which is supported in suitable bearing means 16 in turn fastened to a beam support 18 located at the top 20 of casing 2. Suspended from the top 20 and surrounding the shaft 14 is a tubular member 22 with which the inlet 8 communicates, thus defining an annular passageway 24 for material to pass from the feed inlet downwardly.

Fixed to a collar 26 at the lower end of shaft 14, as shown in Fig. 3, is a particle distributor plate 28 which is located directly below the annular passageway 24 in a position to receive material passing downwardly therethrough. This plate 28 is normally rotated about a vertical axis by means of a motor 30 and a belt-driven pulley 32 secured at the upper end of the shaft 14 (Fig. 2), and the rate of speed of this distributor plate may be varied in accordance with requirements. Consequently, it will be seen that finely divided particles of material passing down through the annular opening in response to the forces of gravity will be intercepted and subjected to centrifugal forces which operate to displace the particles radially outwardly to a greater or lesser degree, dependent upon the speed of rotation of the plate and the size and mass of the particles. Under these conditions, the lighter or smaller particles will be displaced a relatively shorter radial distance while the heavier particles will be displaced a relatively greater radial distance, and the varying sized particles tend to become segregated in annular zones so that a preclassification step is carried out.

To selectively move very small particles away from the preclassified material occurring in the concentric annular zones noted, I further provide the rejector blade element shown consisting of a ring member 36 supported on rods 38 attached to the plate 28. This ring member rotates with plate 28 and has a sealing ring 41 received in annular ribs 40 fast on tubular member 22. Vertically disposed around the ring 36 is a series of rejector blades 42 circumferentially spaced apart, as shown in the drawing. These rejector blades, when rotated, tend to function as a screening device for excluding some particles which may be directed thereagainst. The blades also act somewhat in the nature of a fan to induce a flow of air at points immediately outside of the edges of these fins, and this flow of air has a normal tendency to be directed downwardly.

The blades 42 are secured at their upper ends to another ring element 50 having radially projecting extremities 50a. As may be seen from an inspection of Fig. 3, the ring 50, at its upper side, communicates with an annular opening 52 defined by a recessed edge 52a formed in a separator plate 54. The edge 52a of plate 54 lies in spaced relationship around the tubular member 22 and, together with the member 22, constitutes an annular passageway through which particles which have passed through the rejector plates 42 may be caused to travel.

It is pointed out that, in earlier devices having an annular opening or passageway such as that just above described, it has been proposed to use a fan located above the opening. This fan had to be driven at a speed sufficient for overcoming any downward pull of the rejector blades 42. As a result, the upward pull which had to be employed actually caused both large and small particles to travel and selectivity was thus limited.

In accordance with the present invention, I provide a specially constructed conduit consisting of a scroll-shaped element 56 which extends around the tubular member 22 in a spiral path to define a converging aperture which communicates with the passageway 52 and is closed at its top side as shown. This scroll-shaped element is further illustrated in Figs. 1, 2 and 5 and, as best shown in Fig. 4, is provided at one point with a tubular part 58 extending in a horizontal direction and leading directly into the suction side of a fan 60.

When the fan 60 is operated, air, because of the converging aperture defined by the scroll-shaped element 56, is induced to follow a spiralling path rather than moving upwardly in a straight vertical path. Consequently, as the suction force can only take effect on air passing into the system from points below the classifier mechanism, the result is an upwardly spiralling flow of air. With such an upwardly spiralling flow, it is found that a relatively low fan speed can be employed to just overcome the downward pull of the rejector blades 42 and yet have a particle lifting effect of such limited intensity as to lift only very small particles.

Figure 2:
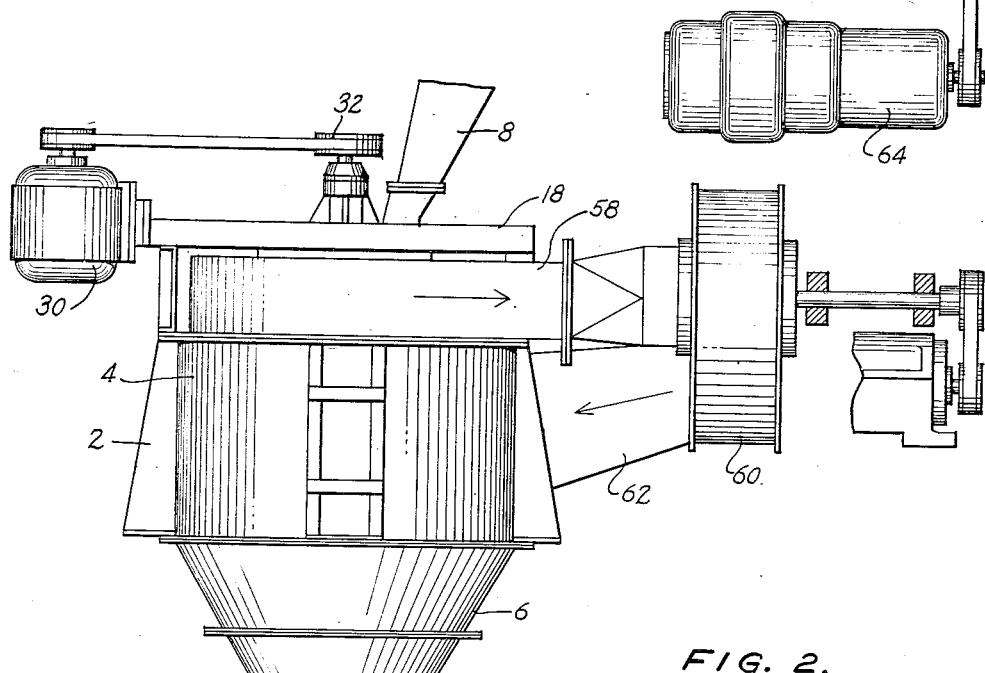
Fig. 2 is a side elevational view further illustrating the apparatus shown in Fig. 1.

Also connected to the fan 60 is a return duct 62 which connects with an opening formed in the housing 4, as best shown in Figs. 1 and 2. When the fan 60 is driven by the motor 64, belt 66 and shaft 68, the air which has been moved in an upwardly spiralling direction is drawn through the tubular part 58 and then recirculated through the return duct 62 at points within the cylindrical section of the housing which, as noted in Fig. 3, occurs in spaced relation to the drum 34. This recirculated air carries with it the fine particles which have been removed through the classifier mechanism and these particles are discharged in a downwardly directed stream around the size of the casing sections 2 and 6 and, finally, out through the discharge outlet 12 where a suitable collecting means may be employed if desired.

I have also found that I may desire to employ a second scroll-shaped element 70 which is supported at the underside of the separator plate 54 in the manner illustrated in Fig. 3. The scroll-shaped element is positioned so that it ocurrs in spaced relation to both the cylindrical section 4 and the drum 34 and, as a result, this scroll-shaped member 70, together with the cylindrical section 4, defines a converging aperture which operates to induce a more positive spiralling action of particles which are passing downwardly through the casing. Air which leaves this converging aperture from the scroll-shaped member 70 may be sucked upwardly to pass between a cone-shaped opening 72 through plates 72a located around the bottom of the conical drum 34, as shown in Fig. 3. It should be understood that the scroll-shaped element 70 may or may not be employed in conjunction with the other parts described. However, the use of the scroll-shaped element 56 is essential to applicant's method and apparatus.

It will be evident from the foregoing description that I have provided an improved method and apparatus for classifying and separating materials in a micron range of from 40–5 microns. In this method, an essential step is to induce an upwardly spiralling current of air which enables an operator to remove particles of relatively small micron size accompanied by little if any coarser type particles. I may desire to carry out this upwardly spiralling action in conjunction with other air current inducing means and I may desire to modify the scroll-shaped structure described for producing spiral flow in various respects in keeping with the scope of the appended claims.

I claim:

1. An improved centrifugal separator including a casing formed with a feed inlet for receiving a finely divided material, a material classifier mechanism mounted within the casing, a fan located on the casing above the classifier mechanism in a position to induce the flow of air upwardly through the classifier, upper and lower conduit means defining converging apertures for guiding material along reversely directed spiralling paths of movement, and said casing being formed with discharge outlet means for selectively releasing classified material carried in said spiralling paths of movement.

2. A structure according to claim 1 in which the upper and lower conduit means communicate with the fan at two opposite sides thereof.

3. An improved centrifugal separator including a casing formed with a feed inlet for receiving a finely divided material, a material classifier mechanism mounted within the casing, a fan located above the classifier mechanism in a position to induce flow of air upwardly through the classifier and scroll-shaped conduit means for guiding material along a spiral path of movement, said classifier mechanism including a rotatable distributor plate and a blade carrying device rotatable with the plate for producing a flow of air in a direction substantially opposite to the direction of flow induced by the said fan and said distributor blade being located below the said scroll-shaped conduit means.

4. A structure as defined in claim 3 in which the blade means include an upper series of radially disposed blade elements which produce a downwardly directed flow of air and a second series of radially disposed blade elements located below the said first series for inducing a flow of air in an upward direction.

5. In a centrifugal separator of the class described an outer casing, a tubular feed inlet located at the upper side of the casing for introducing a finely divided material therein, a material classifying mechanism mounted within the casing in a position to receive material passing from the said feed inlet, a fan located on the casing at a point above the classifying mechanism in a position to induce flow of air upwardly therethrough and a scroll-shaped conduit for guiding a classified component of the finely divided material in an upwardly spiralling path at points extending between the separator mechanism and the said fan.

6. An improved centrifugal separator including an outer casing formed with a feed inlet for receiving a finely divided material, a material classifier mechanism mounted within the casing, fan means for producing a flow of air upwardly through the classifier mechanism, conduit means for inducing a spiralling movement of air and classified material passing upwardly away from the classifier mechanism and outlet means formed in the casing for selectively releasing classified material, the classifier mechanism including a distributor plate rotatable about a vertical axis and a particle rejecting device fixed to said shaft in spaced relation to the distributor plate and presenting a plurality of circumferentially spaced-apart apertures through which classifier material may pass in response to suction of the said means for producing flow of air.

7. An improved centrifugal separator including an outer casing formed with a feed inlet for receiving a finely divided material, a material classifier mechanism mounted within the casing, fan means for producing a flow of air upwardly through the classifier mechanism, conduit means for inducing a spiralling movement of air and classified material passing upwardly away from the classifier mechanism, outlet means formed in the casing for selectively releasing classified material, said means for producing a flow of air upwardly through the classifier including a series of rotating blades which induce a flow of air upwardly, a second series of rotating blades spaced immediately above the said first series of blades for producing a flow of air downwardly and a fan located above the casing for producing a flow of air which operates in conjunction with the flow of air produced by the said first series of blades to move classified material upwardly against the resistance of downwardly directed flow of air from the said second series of blades.

8. An improved centrifugal separator including an outer casing formed with a feed inlet for receiving a finely divided material, a material classifier mechanism mounted within the casing, fan means for producing a flow of air upwardly through the classifier mechanism, conduit means for inducing a spiralling movement of air and classified material passing upwardly away from the classifier mechanism, outlet means formed in the casing for selectively releasing classified material, and said conduit means for inducing spiralling movement of air including a duct whose sidewalls approach one another to form a converging aperture which reaches its minimum width at a point of junction with the said fan means for producing a flow of air.

9. An improved centrifugal separator including an outer casing formed with a feed inlet for receiving a finely divided material, a material classifier mechanism mounted within the casing, fan means for producing a flow of air upwardly through the classifier mechanism, conduit means for inducing a spiralling movement of air and classified material passing upwardly away from the classifier mechanism, outlet means formed in the casing for selectively releasing classified material, and the said conduit means including two spirally-shaped ducts having converging apertures which terminate at either side of the said fan means for producing a flow of air.

References Cited in the file of this patent

UNITED STATES PATENTS

| | | |
|---|---|---|
| 1,517,900 | Gay | Dec. 2, 1924 |
| 1,861,247 | Stebbins | May 31, 1932 |
| 2,070,650 | Crites | Feb. 16, 1937 |